(12) United States Patent
Kruempel et al.

(10) Patent No.: US 10,899,041 B2
(45) Date of Patent: Jan. 26, 2021

(54) PROCESS FOR PREPARING A POLYOLEFIN COMPOSITION

(71) Applicant: Basell Polyolefine GmbH, Wesseling (DE)

(72) Inventors: Peter Kruempel, Bad Camberg (DE); Elke Damm, Bad Vilbel (DE); Reinhard Kuehl, Bornheim (DE); Phil Pyman, Lymm (GB)

(73) Assignee: Basell Polyolefine GmbH, Wesseling (DE)

( * ) Notice: Subject to any disclaimer, the term of this patent is extended or adjusted under 35 U.S.C. 154(b) by 48 days.

(21) Appl. No.: 16/507,987

(22) Filed: Jul. 10, 2019

(65) Prior Publication Data

US 2019/0329451 A1 Oct. 31, 2019

Related U.S. Application Data

(62) Division of application No. 15/532,016, filed as application No. PCT/EP2015/078473 on Dec. 3, 2015, now abandoned.

(30) Foreign Application Priority Data

Dec. 4, 2014 (EP) ..................................... 14196371

(51) Int. Cl.
*B29B 7/72* (2006.01)
*B29B 7/00* (2006.01)
(Continued)

(52) U.S. Cl.
CPC .............. *B29B 7/728* (2013.01); *B29B 7/005* (2013.01); *B29B 7/007* (2013.01); *B29B 7/42* (2013.01);
(Continued)

(58) Field of Classification Search
CPC ....... B29C 48/04; B29C 48/022; B29C 48/92; B29C 48/286; B29C 48/288;
(Continued)

(56) References Cited

U.S. PATENT DOCUMENTS 3,638,916 A 2/1972 Ursic et al.
4,237,082 A 12/1980 LaSpisa et al.
(Continued)

FOREIGN PATENT DOCUMENTS

CH 384849 A 2/1965
CN 1178807 A 4/1998
(Continued)

OTHER PUBLICATIONS

The International Search Report and Written Opinion for PCT/EP2015/078473 dated Mar. 11, 2016.
(Continued)

*Primary Examiner* — Robert J Grun

(57) ABSTRACT

A process for continuously preparing a polyolefin composition made from or containing a bimodal or multimodal polyolefin and one or more additives in an extruder device equipped with at least one hopper. The process includes the steps of supplying a bimodal or multimodal polyolefin in form of a polyolefin powder to the hopper; (a) measuring the flow rate of the polyolefin powder or (b) measuring the flow rate of the prepared polyolefin pellets; supplying one or more additives to the hopper; adjusting the flow rates of the additives supplied to the hopper in response to the measured flow rate of the polyolefin powder or adjusting the flow rate of the polyolefin powder in response to the measured flow rate of the polyolefin pellets; melting and homogenizing the polyolefin powder and additives within the extruder device; and pelletizing the molten polyolefin composition into the polyolefin pellets.

19 Claims, 2 Drawing Sheets

(51) Int. Cl.

| | |
|---|---|
| *B29B 9/06* | (2006.01) |
| *B29B 7/90* | (2006.01) |
| *B29B 7/88* | (2006.01) |
| *B29B 7/48* | (2006.01) |
| *B29C 48/285* | (2019.01) |
| *G05D 11/13* | (2006.01) |
| *B29B 7/42* | (2006.01) |
| *B29B 7/60* | (2006.01) |
| *B29C 48/04* | (2019.01) |
| *B29C 48/00* | (2019.01) |
| *B29C 48/92* | (2019.01) |
| *C08J 3/20* | (2006.01) |
| *C08J 3/22* | (2006.01) |
| *C08K 3/04* | (2006.01) |
| *B29B 9/12* | (2006.01) |
| *B29C 48/03* | (2019.01) |
| *B29B 7/38* | (2006.01) |
| *B29K 23/00* | (2006.01) |
| *B29K 105/16* | (2006.01) |
| *B29K 507/04* | (2006.01) |

(52) U.S. Cl.
CPC ............ *B29B 7/48* (2013.01); *B29B 7/603* (2013.01); *B29B 7/88* (2013.01); *B29B 7/90* (2013.01); *B29B 9/065* (2013.01); *B29B 9/12* (2013.01); *B29C 48/022* (2019.02); *B29C 48/04* (2019.02); *B29C 48/286* (2019.02); *B29C 48/288* (2019.02); *B29C 48/298* (2019.02); *B29C 48/92* (2019.02); *C08J 3/203* (2013.01); *C08J 3/22* (2013.01); *C08K 3/04* (2013.01); *G05D 11/132* (2013.01); *B29B 7/38* (2013.01); *B29B 9/06* (2013.01); *B29C 48/03* (2019.02); *B29C 2948/926* (2019.02); *B29C 2948/92104* (2019.02); *B29C 2948/92828* (2019.02); *B29K 2023/06* (2013.01); *B29K 2023/065* (2013.01); *B29K 2105/16* (2013.01); *B29K 2507/04* (2013.01); *C08J 2323/06* (2013.01); *C08J 2323/08* (2013.01)

(58) Field of Classification Search
CPC . B29C 48/298; B29C 48/03; B29C 2948/926; B29B 7/728; B29B 7/005; B29B 7/42; B29B 7/90; B29B 9/12; B29B 7/007; B29B 7/48; B29B 7/88; B29B 9/065; B29B 7/603; B29B 7/38; B29B 9/06; B29B 7/60; G05D 11/132; C08J 3/22; C08J 3/203; C08J 2323/08; C08J 2323/06; C08K 3/04; B29K 2023/06; B29K 2023/065; B29K 2105/16; B29K 2507/04; C08F 10/02; C08F 2500/18
See application file for complete search history.

(56) References Cited

U.S. PATENT DOCUMENTS

| | | | |
|---|---|---|---|
| 4,448,736 A | 5/1984 | Emery et al. | |
| 4,510,271 A | 4/1985 | Muhle et al. | |
| 4,684,488 A | 8/1987 | Rudolph | |
| 5,314,579 A | 5/1994 | Sung | |
| 6,254,374 B1 | 7/2001 | Hatfield | |
| 6,380,311 B1 | 4/2002 | Razavi et al. | |
| 6,492,485 B1 | 12/2002 | Gohr et al. | |
| 8,399,543 B2 | 3/2013 | Dewachter | |
| 8,543,242 B2 | 9/2013 | Odi | |
| 8,636,138 B2 | 1/2014 | Blickley et al. | |
| 9,089,831 B2 | 7/2015 | Rohatgi et al. | |
| 9,212,240 B2 | 12/2015 | Goransson et al. | |
| 2003/0096901 A1 | 5/2003 | Aarila et al. | |
| 2004/0020272 A1 | 2/2004 | Lin et al. | |
| 2006/0063896 A1 | 3/2006 | McElvain et al. | |
| 2006/0287442 A1 | 12/2006 | McElvain et al. | |
| 2009/0022007 A1 | 1/2009 | Massarotto | |
| 2011/0015331 A1 | 1/2011 | Dewachter | |
| 2011/0120498 A1 | 5/2011 | Samaras | |
| 2011/0124545 A1 | 5/2011 | Mort, III et al. | |
| 2013/0099424 A1 | 4/2013 | Rohatgi et al. | |
| 2017/0002187 A1 | 1/2017 | Tynys et al. | |
| 2017/0341266 A1 | 11/2017 | Kruempel et al. | |

FOREIGN PATENT DOCUMENTS

| | | |
|---|---|---|
| CN | 1388202 A | 1/2003 |
| CN | 1780724 A | 5/2006 |
| CN | 102947382 A | 2/2013 |
| CN | 102993556 A | 3/2013 |
| DE | 2751225 A1 | 5/1979 |
| DE | 10230321 A1 | 1/2004 |
| EP | 191338 A2 | 8/1986 |
| EP | 238796 A2 | 9/1987 |
| EP | 881237 A1 | 12/1998 |
| EP | 882571 A1 | 12/1998 |
| EP | 1305155 B1 | 10/2008 |
| EP | 2016995 A1 | 1/2009 |
| EP | 2030757 A1 | 3/2009 |
| EP | 2873685 A1 | 5/2015 |
| JP | S49099138 A | 9/1974 |
| JP | H05309647 A | 11/1993 |
| JP | H10180841 A | 7/1998 |
| JP | 2001198948 A | 7/2001 |
| JP | 2002-273201 A | 9/2002 |
| JP | 2003345062 A | 12/2003 |
| JP | 2004137450 A | 5/2004 |
| JP | 2007291158 A | 11/2007 |
| JP | 2012510388 A | 5/2012 |
| JP | 2012200931 A | 10/2012 |
| KR | 10-1162516 B1 | 7/2012 |
| RU | 2115665 C1 | 7/1998 |
| RU | 2235742 C2 | 9/2004 |
| RU | 2017121182 A | 1/2019 |
| SU | 1785908 A1 | 1/1993 |
| WO | 0035646 A1 | 6/2000 |
| WO | 2004004996 A1 | 1/2004 |
| WO | 2005068516 A2 | 7/2005 |
| WO | 2009059967 A2 | 5/2009 |
| WO | 2011058861 A1 | 5/2011 |
| WO | 2011101438 A1 | 8/2011 |
| WO | 2013062810 A1 | 5/2013 |

OTHER PUBLICATIONS

The International Search Report and Written Opinion for PCT/EP2015/078470 dated Mar. 14, 2016.
APT Japan Co., Ltd, K-TRON Quantitative Feeder, https://apte.jp/product/ktron/smart.html, 2010, 1 page.
Kuma Engineering Co., Ltd, Powder/Grain Flowmeter, Japan, http://www.kuma-eng.co.jp/blog/archives/2005/09/post.html, 2005, 3 pages.
Rubber Industry Manual, vol. 10, Plant Design, editted by Tu Yuxian, pp. 299-302, Chemical Industry Press, Beijing, Jun. 1995.
Letter from Coperion K-Tron (Schweiz) GmbH dated Dec. 19, 2018.
K-Tron Soder Smart Feeding Solution, Application Example, Polyolefins/Bulk Polymer Compounding, 08.29/5510-en, Sep. 2001, 4 pages.
K-Tron Process Group, Application Example, Feedings & Conveying in Polyolefin Production, 2010 K-Tron International, Inc. A-800101-EN (0290000451) Feb. 2010, 12 pages.
Coperion K-Tron, Application Example, Feeding & Conveying in Polyolefin Production, 2010 K-Tron Technologies, Inc., A-800101-en (0290000451), Feb. 2014, pp. 1-12, XP055548544.
Optimising Feeding and Conveying During Polyolefin Production, Success Depends on the Components, https://cpp.industrie.de/plant-processing/success-depends-on-the-components/, Mar. 29, 2011.
K-Tron Feeders, K-Tron Product Specification Smart Flow Meter K-SFM-350, Rev, Nov. 2009, pp. 1-2, XP055548542.

(56) References Cited

OTHER PUBLICATIONS

Tolinski, Additives for Polyolefins, William Andrew, Oxford, UK, ISBN:978-0-81-552051-1, 2009, pp. 139-141, 148-150, and 237-239.
Perry et al., Perry's Chemical Engineers' Handbook, 6th edition, McGraw-Hill, Inc., 1984, pp. 21-5 to 21-7.
Paul et al., Handbook of Industrial Mixing Science and Practice, A John Wiley & Sons, Inc. Publication, 2004, pp. 940, 943 and 944.
Smith et al., Valve Selection Handbook, 5th edition, Engineering Fundamentals for Selecting the Right Valve Design for Every Industrial Flow Application, Elsevier Inc., 2004, pp. 137-142.

PROCESS FOR PREPARING A POLYOLEFIN COMPOSITION

CROSS-REFERENCE TO RELATED APPLICATIONS

This application is a divisional application of co-pending U.S. patent application Ser. No. 15/532,016, filed May 31, 2017, which is the U.S. National Phase of PCT International Application PCT/EP2015/078473, filed Dec. 3, 2015, claiming the benefit of priority to European Patent Application No. 14196371.0, filed Dec. 4, 2014, the disclosures of which are incorporated herein by reference in their entirety.

FIELD OF THE INVENTION

In general, the present disclosure relates to the field of chemistry. More specifically, the present disclosure relates to a process for continuously preparing a polyolefin composition made from or containing a bimodal or multimodal polyolefin and one or more additives. In particular, the present disclosure relates to a process for continuously preparing a polyolefin composition made from or containing a polyolefin and one or more additives, wherein the polyolefin is a bimodal or multimodal high density polyethylene.

BACKGROUND OF THE INVENTION

To achieve and maintain certain properties, polyolefin compositions may contain additional substances. These additives can influence the properties of the polyolefin compositions, even when added in small quantities. In some processes, the additives are combined with polyolefins directly after their polymerization during the pelletizing step.

Bimodal or multimodal polyolefins can be prepared in a cascade of two or more polymerization reactors which can have different polymerization conditions. The individual particles of the polyolefin powder obtained in such polymerization processes may vary widely in their composition. Accordingly, some processes seek to homogenize these polyolefins in the pelletizing step.

For the preparation of bimodal or multimodal polyolefins, a goal is to ensure that the plastics additives are uniformly distributed within the polymer. This uniformity includes an even homogenization throughout the polymeric material, the ratio of plastics additives to polyolefinic material, and the ratio between the different additives for the polyolefin pellets. Furthermore, it a goal is that the homogenization method be reliable and economic.

SUMMARY OF THE INVENTION

In general embodiments, the present disclosure provides a process for continuously preparing a polyolefin composition made from or containing a bimodal or multimodal polyolefin and one or more additives in an extruder device equipped with at least one hopper, wherein polyolefin pellets are prepared from the polyolefin composition in the extruder device, the process including the steps of
(i) supplying a bimodal or multimodal polyolefin in form of a polyolefin powder at a flow rate to the hopper;
(ii) (a) measuring the flow rate of the polyolefin powder supplied to the hopper or
(b) measuring a flow rate of the polyolefin pellets prepared in the extruder device;
(iii) supplying one or more additives to the hopper;
(iv) (a) when measuring the flow rate of the polyolefin powder supplied to the hopper, adjusting the flow rates of the additives supplied to the hopper in response to the measured flow rate of the polyolefin powder or,
(b) when measuring the flow rate of the polyolefin pellets prepared in the extruder device, adjusting the flow rate of the polyolefin powder to the hopper in response to the measured flow rate of the polyolefin pellets and either
(1) keeping the flow rates of the additives supplied to the hopper constant or
(2) adjusting the flow rates of the additives supplied to the hopper in response to the measured flow rate of the polyolefin pellets;
(v) transferring the polyolefin powder and the additives from the hopper into the extruder device;
(vi) melting and homogenizing the polyolefin powder and the additives within the extruder device to form a molten polyolefin composition; and
(vii) pelletizing the molten polyolefin composition, thereby yielding the polyolefin pellets.

In some embodiments, the flow rate of the polyolefin powder is measured.

In some embodiments, the flow rate of the polyolefin pellets prepared in the extruder device is measured.

In some embodiments, the flow rate of the polyolefin powder or the flow rate of the polyolefin pellets is measured by a solids flow meter.

In some embodiments, the polyolefin powder is supplied from a storage vessel, into which the polyolefin powder is kept in free flowing state by a discharging aid.

In some embodiments, the polyolefin powder and the additives are first supplied to a mixing device, which mixes the polyolefin powder and the additives. Then, the mixture of polyolefin powder and the additives is transferred from the mixing device to the hopper, wherein (a) the flow rates of the additives are measured while being supplied to the mixing device and the flow rates of the additives supplied to the mixing device are adjusted in response to the measured flow rate of the polyolefin powder supplied to the mixing device or (b) the flow rates of the additives and the polyolefin powder supplied to the mixing device are adjusted in response to the measured flow rate of the polyolefin pellets.

In some embodiments, the mixing device is a paddle mixer containing two horizontally orientated counter-rotating shafts.

In some embodiments, the polyolefin powder is transferred from the storage vessel to the hopper by gravity.

In some embodiments, the polyolefin powder is obtained by polymerizing one or more 1-olefins in a cascade of at least two polymerization reactors.

In some embodiments, the polyolefin is a polyethylene.

In some embodiments, the polyethylene is a high density polyethylene having a density determined according to ISO 1183 at 23° C. from about 0.945 to about 965 g/cm$^3$.

In some embodiments, an additive is carbon black.

In some embodiments, the carbon black is fed in form of a carbon black masterbatch.

In some embodiments, the process additionally includes the following steps (viii) supplying a second amount of polyolefin pellets to the same hopper; and
(ix) adjusting the flow rate of the second amount of polymer pellets fed to the hopper in response to the measured flow rate of the polyolefin powder or in response to the measured flow rate of the resulting polyolefin pellets.

In some embodiments, the extruder device is a continuous mixer with counter rotating and intermeshing double screw or the extruder device contains at least one co-rotating double screw extruder.

BRIEF DESCRIPTION OF THE DRAWINGS

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

The following figures illustrate preferred embodiments of the subject matter disclosed herein. The claimed subject matter may be understood by reference to the following description taken in conjunction with the accompanying figures, in which like reference numerals identify like elements, and in which:

DETAILED DESCRIPTION OF THE INVENTION

Figure 1:
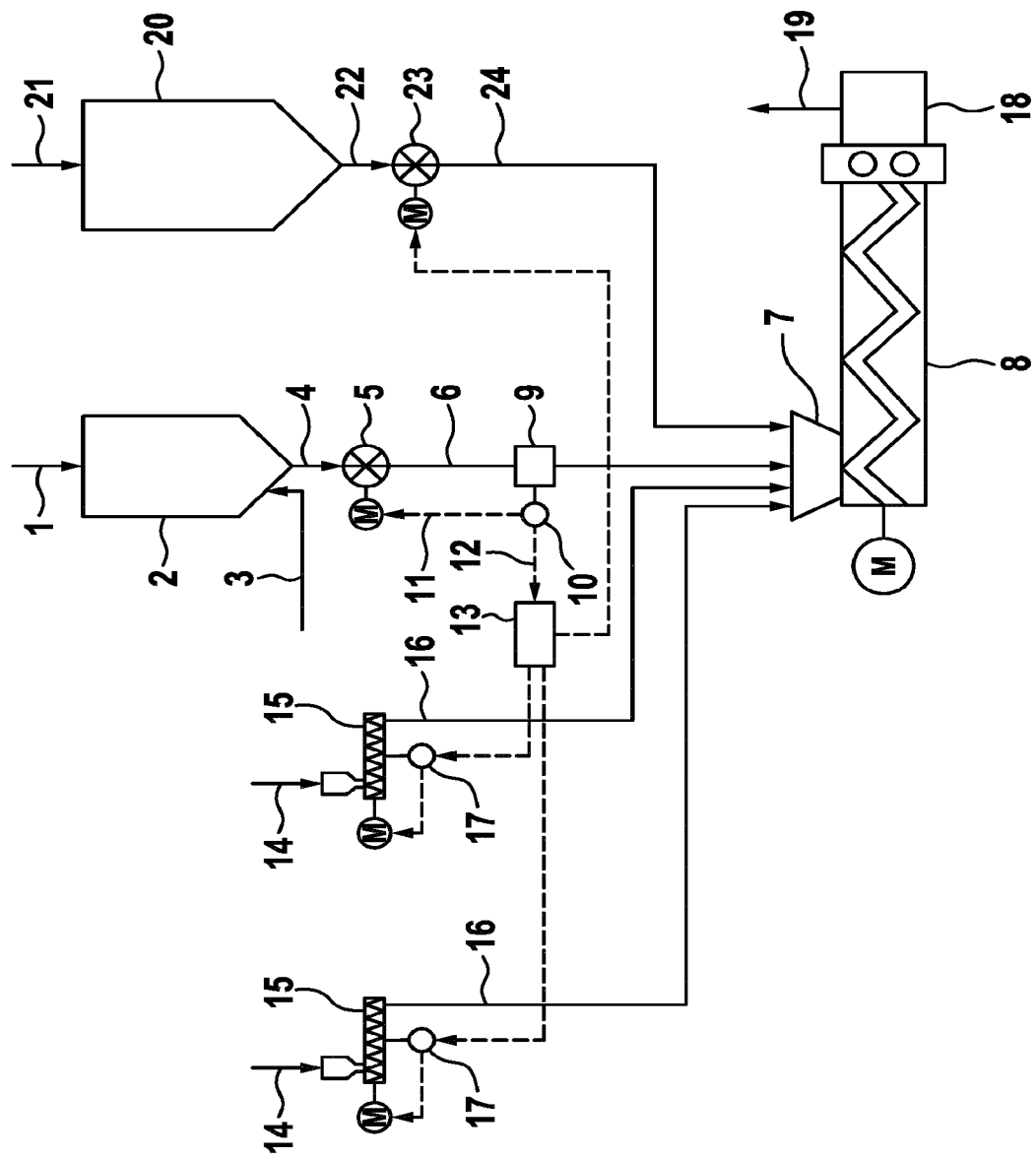
FIG. 1 shows schematically an embodiment of a set-up for preparing a polyolefin composition in which the polyolefin powder and the additives are supplied directly to the hopper of the extruder device.

In a general embodiment, the present disclosure provides a process for preparing a polyolefin composition made from or containing a bimodal or multimodal polyolefin and one or more additives. In some embodiments, the polyolefins are obtained by polymerizing olefins, alternatively, by polymerizing 1-olefins, that are hydrocarbons having terminal double bonds, without being restricted thereto. In some embodiments, the monomers are nonpolar olefinic compounds, including aryl-substituted 1-olefins. In other embodiments, the 1-olefins are linear or branched $C_2$-$C_{12}$-1-alkenes, including linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. In some embodiments, the polyolefin is obtained by polymerizing mixtures of various 1-olefins. In some embodiments, the olefins also include olefins in which the double bond is part of a cyclic structure which can have one or more ring systems. In some embodiments, the cyclic-containing olefin is cyclopentene, norbornene, tetracyclodo-decene or methylnorbornene or dienes such as 5-ethylidene-2-norbornene, norbornadiene or ethylnorbornadiene. In some embodiments, the polyolefin is obtained by polymerizing mixtures of two or more olefins.

In some embodiments, the process of the present disclosure is a process for preparing polyolefin compositions made from or containing polyolefins which were obtained by homopolymerization or copolymerization of ethylene or propylene. In some embodiments and as comonomers in propylene polymerization, up to 40 wt. % of ethylene and/or 1-butene is used, based upon the total weight of the final copolymer.

In some embodiments, the process of the present disclosure refers to preparing a polyolefin composition made from or containing polyolefins obtained by homopolymerizing or copolymerizing ethylene. In some embodiments, the polyolefin compositions is made from or contains polyethylenes in which ethylene is copolymerized with up to 40 wt. % of $C_3$-$C_8$-1alkenes. In some embodiments, the 1-alkene is 1-butene, 1-pentene, 1-hexene, 1-octene, or mixtures thereof. In some embodiments, the ethylene is copolymerized with up to 20 wt. % of 1-butene, 1-hexene, or mixtures thereof.

In some embodiments, the process for making the polyolefin includes solution processes, suspension processes, and gas-phase processes. In some embodiments, the process is a suspension polymerization. In other embodiments, the process uses a suspension polymerization with loop reactors or stirred tank reactors. In some embodiments, the process is a gas-phase polymerization. In other embodiments, the process uses gas-phase fluidized-bed reactors or multi-zone circulating gas phase reactors. The polymerization can be carried out batchwise or continuously in two or more stages. In some embodiments, the process is continuous.

In some embodiments, the process of the present disclosure may be employed for preparing polyolefin compositions of many types of polyolefin polymers. The process of the present disclosure can be used for preparing polyolefin compositions made from or containing bimodal or multimodal polyolefins whereby the terms "bimodal" and "multimodal" refer to the modality of the molecular weight distribution. In some embodiments, the polymers can be obtained from polymerizing olefins in a cascade of two or more polymerization reactors under different reaction conditions. Thus, the "modality" indicates how many different polymerization conditions were utilized to prepare the polyolefin, without regard to whether the modality of the molecular weight distribution can be recognized as separated maxima in a gel permeation chromatography (GPC) curve. The term multimodal can include bimodal. In addition to the molecular weight distribution, the polyolefin polymer can also have a comonomer distribution. In some embodiments, the average comonomer content of polymer chains with a higher molecular weight is higher than the average comonomer content of polymer chains with a lower molecular weight. In some embodiments, identical or very similar reaction conditions in the polymerization reactors of the reaction cascade can be used to prepare narrow molecular weight polyolefin polymers. In some embodiments, the resulting multimodal polyolefins may contain individual polyolefin particles of the polyolefin powder that have composition that vary widely.

The polymerization can be carried out using a variety of olefin polymerization catalysts. In some embodiments, the polymerization can be carried out using Phillips catalysts based on chromium oxide, using titanium-based Ziegler- or Ziegler-Natta-catalysts, using single-site catalysts, or using mixtures of such catalysts.

In some embodiments, the polyolefins are obtained as powder that means in the form of small particles. In some embodiments, the particles have a more or less regular morphology and size, depending on the catalyst morphology and size, and on polymerization conditions. Depending on the catalyst used, the particles of the polyolefin powder have a mean diameter of from a few hundred to a few thousand micrometers. In the case of chromium catalysts, the mean particle diameter can be from about 300 to about 1600 μm. In the case of Ziegler type catalysts, the mean particle diameter can be from about 100 to about 3000 μm. In some embodiments, the polyolefin powders have a mean particle diameter of from about 150 to about 250 μm.

In some embodiments, the polyolefins for preparing the polyolefin compositions of the present disclosure are polyethylenes having an ethylene content of from about 50 to about 100 wt. %, alternatively from about 80 to about 100 wt. %, and alternatively from about 98 to about 100 wt. %, based upon the total weight of the polyethylene. Accordingly, the content of other olefins in the polyethylenes is from about 0 to about 50 wt. %, alternatively from about 0 to about 20 wt. %, and alternatively from about 0 to about 2 wt. %, based upon the total weight of the polyethylene.

In some embodiments, the density of the polyethylene compositions obtained by the process of the present disclosure is from about 0.90 $g/cm^3$ to about 0.97 $g/cm^3$. Alternatively, the density is in the range of from about 0.920 to about 0.968 $g/cm^3$ and alternatively in the range of from about 0.945 to about 0.965 $g/cm^3$. The density is determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes.

In some embodiments, the melt flow rate $MFR_{21.6}$ at 190° C. under a load of 21.6 kg of the polyethylene compositions, determined according to DIN EN ISO 1133:2005 condition G, is from about 1 g/10 min to about 80 g/10 min, alternatively from about 2 g/10 min to about 50 g/10 min and alternatively from about 5 g/10 min to about 25 g/10 min.

The polyolefin compositions are prepared by combining the polyolefins with one or more additives. In some embodiments, the additives are uniformly distributed within the polyolefin. In some embodiments, the types of additives for preparing polyolefin compositions are antioxidants, light stabilizers, acid scavengers, lubricants, processing aids, antiblocking agents, slip agents, antistatics agents, antifogging agents, pigments or dyes, nucleating agents, flame retardants or fillers. In some embodiments, several additives are added to the polyolefin compositions. The multiple additives can be different types of additives. In some embodiments, several representatives of one type of additive are added to a polyolefin composition. In some embodiments, the additives are described in Hans Zweifel, Plastics Additives Handbook, 5th Edition, Munich, 2001 (incorporated herein by reference).

In some embodiments, one of the additives is carbon black. In some embodiments, the carbon black is supplied to the hopper of the extruder device in form of a carbon black masterbatch.

The process of the present disclosure is carried out using an extruder device equipped with at least one hopper. The hopper receives material to be fed to the extruder device. The material is then transferred from the hopper into the extruder device. The extruder device of the present disclosure is equipped with at least one hopper to which the polyolefin powder and at least one additive are supplied. The extruder device can be equipped with one or more additional hoppers for feeding additional materials to the extruder device.

The extruder device applies heat and mechanical energy to the mixture of polyolefin powder and additives. In some embodiments, the extruder device is an extruder or continuous mixer. These extruders or mixers can be single- or two-stage machines which melt and homogenize the polyethylene composition. In some embodiments, the extruders are pin-type extruders, planetary extruders or co-rotating disk processors. In some embodiments, the extruders are combinations of mixers with discharge screws and/or gear pumps. In some embodiments, the extruders are screw extruders. In other embodiments, the extruders are constructed as a twin-screw machine. In some embodiments, the extruder devices are twin-screw extruders and continuous mixers with discharge elements. In other embodiments, the extruder devices are continuous mixers with counter rotating and intermeshing double screw or the extruder device includes at least one co-rotating double screw extruder. Machinery of this type is manufactured by Coperion GmbH, Stuttgart, Germany; KraussMaffei Berstorff GmbH, Hannover, Germany; The Japan Steel Works LTD., Tokyo, Japan; Farrel Corporation, Ansonia, USA; or Kobe Steel, Ltd., Kobe, Japan. In some embodiments, the extruder devices are further equipped with units for pelletizing the melt, such as underwater pelletizers.

In some embodiments, the process disclosed herein includes supplying the polyolefin in form of a polyolefin powder and the additives to one hopper and then transferring the combined material into the extruder device for melting and further mixing. In some embodiments, the polyolefin powder is supplied from a storage vessel, alternatively, a storage vessel having a conical bottom. In some embodiments, the storage vessel for supplying the polyolefin powder is equipped with a discharging aid which keeps the polyolefin powder in free flowing state. In some embodiments, the discharging aid is the introduction of an inert gas into the bottom to the storage vessel. In some embodiments, the inert gas is nitrogen. In some embodiments, the inert gas is introduced into a conical bottom of the storage vessel. In some embodiments, the polyolefin powder is transferred from the storage vessel to the hopper by gravity.

In some embodiments, the additives are supplied from dedicated storage vessels for the additives. In other embodiments, the additives are supplied directly from transport containers such as big bags. The additives which are utilized for preparing the polyolefin compositions of the present disclosure can be supplied in solid form, liquid or dissolved form. In some embodiments, when the additives are supplied in solid form, the additives are in the form of small particles. In some embodiments, the additives are supplied individually, in one or more mixtures made from or containing some of the selected additives, or as a mixture of the additives. In some embodiments, the additives are supplied in form of solid particles.

In some embodiments, the prepared polyolefin composition is made from or contains a polyolefin and one or more additives. In some embodiments, the prepared polyolefin composition is made from a recipe which identifies the nature of the employed polyolefin powder, the nature of the additives, their number, their quantity and their ratio. The polyolefin composition is made from or contains primarily the polyolefin. In some embodiments, the polyolefin portion of the prepared polyolefin composition is from about 80 to about 99.98 wt. %, alternatively from about 95 to about 99.95 wt. %, and alternatively from about 98 to about 99.9 wt. %, based upon the total weight of the polyolefin composition.

In some embodiments, the amount of polyolefin powder supplied to the hopper of the extruder device is regulated by a feeding device. In some embodiments, the feeding device is a rotary valve or a screwfeeder. By varying the speed of the feeding device, the amount of polyolefin powder supplied to the extruder device can be altered. In some embodiments, the speed of the feeding device is controlled by a controller in a way that the fed amount of polyolefin powder corresponds to a preselected set-point corresponding to the selected amount of the polyolefin in the polyolefin composition.

In some embodiments, the ratio of additives to polyolefin in the polyolefin composition is kept constant by adjusting the flow rates of the additives to the extruder device based on the supplied amount of polyolefin powder. In some embodiments, the ratio is maintained with high flow rates of polyolefin powder. By using the actual fed amount of polyolefin powder supplied to the extruder for calculating these set points for the additives, small variations in the speed of the polyolefin powder feeding device are instantaneously compensated by corresponding modifications in the flow rates of the additives. This process of adjustment can be contrasted with solely using set points derived from the recipe of the polyolefin composition for regulating the flow rates of the additives. Accordingly the amount of polyolefin powder supplied to the hopper of the extruder device is continuously measured. This occurs by continuously determining the flow rate of the polyolefin powder.

In some embodiments, the flow rate of the polyolefin pellets prepared in the extruder device is measured and the flow rate of the polyolefin powder to the extruder device is adjusted based on the amount of polyolefin pellets produced in the extruder device. By using a measurement of the flow rate of the produced polymer pellets for adjusting the flow rate of the polyolefin powder, difficulties in measuring polymer flow rates of polymer particles having a certain stickiness are reduced. In some embodiments, the flow rate of the polyolefin pellets is measured on dried polyolefin pellets. Alternatively, the flow rate is measured downstream of an underwater pelletizer and a centrifugal drier. In this embodiment, the flow rates of the additives supplied to the hopper are either kept constant at a pre-determined value and the ratio of additives to polyolefin in the polyolefin composition is controlled by solely adjusting the flow rate of the polyolefin powder supplied to the hopper or both the flow rate of the polyolefin powder and the flow rates of the additives supplied to the hopper are adjusted based on the actual amount of polyolefin pellets produced in the extruder device, alternatively employing different control characteristics for controlling the flow rates of the additives and for controlling the feed of polyolefin powder.

In some embodiments, the flow rate of the polyolefin powder supplied to the hopper or the flow rate of the polyolefin pellets prepared in the extruder device are measured by a solids flow meter. In some embodiments, solids flow meters can use impact plate, measuring chute or Coriolis measuring technologies. Such solids flow meters are commercially available from Schenck Process, Whitewater, Wis., USA or Coperion K-Tron, Gelnhausen, Germany. In some embodiments, the solids flow meter is equipped with a controller. This controller allows adjusting the speed of the feeding device, which supplies the polyolefin powder to the extruder, based on information regarding the supplied amount of polyolefin powder.

The measured flow rate of the polyolefin powder supplied to the hopper or the measured flow rate of the polyolefin pellets can be used to adjust the flow rates of the additives supplied to the hopper. In some embodiments, the controller of the solid flow meter transmits a signal, which is indicative of the flow rate of the polyolefin powder to the hopper to a computing unit such as a computer. The computing device continuously calculates set points for selected flow rates of additives to the hopper which set points reflect the amounts of polyolefin powder supplied to the extruder device.

In some embodiments, the process for preparing a polyolefin composition further includes the step of supplying polyolefin pellets to the hopper of the extruder device. This option permits further adding pelletized polymer materials to the polyolefin composition. In some embodiments, these pelletized polymer materials are added in amounts smaller than the polyolefin powder. In some embodiments, the pelletized polymer materials are previously produced polyolefin compositions, which do not comply with specified property requirements, or transition materials, which were obtained in a polymerization while transitioning from one polyolefin grade to another. In some embodiments, the polyolefin pellets are supplied to the same hopper as the polyolefin powder and the additives. In some embodiments, the flow rate of the polyolefin pellets to the hopper is adjusted based on the measured flow rate of the polyolefin powder supplied to the hopper or based on the measured flow rate of the polyolefin pellets. The computing device then continuously calculates a set point for selected flow rates of polyolefin pellets to the hopper.

The combination of polyolefin powder and additives is transferred from the hopper into the extruder device and then melted and homogenized within the extruder device. The melt is thereafter passed to a pelletizing unit and there transformed into pellets.

In some embodiments, the polyolefin powder and the additives are first mixed and then supplied as mixture to the hopper of the extruder device. The polyolefin powder and the additives are supplied to a mixing device. The flow rates of the additives supplied to the mixing device are then adjusted in response to the flow rate of the polyolefin powder supplied to the mixing device. Alternatively, the flow rate of the polyolefin powder supplied to the mixing device is adjusted in response to the measured flow rate of the polyolefin pellets. In some embodiments, mixing devices are paddle mixers including two horizontally orientated counter-rotating shafts. The shafts are equipped with paddles of an appropriate geometry. The rotating shafts move the composition of polyolefin powder and additives horizontally along the axis of the shafts and at the same time mix the components intensively. Such paddle mixers are commercially available from Köllemann GmbH, Adenau, Germany or J. Engelsmann AG, Ludwigshafen, Germany. The mixture of polyolefin powder and additives exits the mixing device at the end of the shafts and is then transferred to the hopper of the extruder device. In some embodiments, the transfer to the hopper of the extruder device occurs by gravity.

FIG. 1 shows schematically an embodiment of a set-up for preparing a polyolefin composition.

Polyolefin powder is provided via line (1) to a polyolefin powder storage vessel (2). Nitrogen is introduced into storage vessel (2) from the bottom via line (3). The polyolefin powder is supplied via line (4) to rotary valve (5) which is operated by a motor M. The polyolefin powder is then further transferred by gravity via line (6) to hopper (7) of extruder device (8) which is also operated by a motor M. By varying the speed of motor M of rotary valve (5), the flow rate of the polyolefin powder supplied to hopper (7) can be adjusted. As the polyolefin powder is transferred from rotary valve (5) to hopper (7), the polyolefin powder passes a solid flow meter (9) which measures the flow rate of the polyolefin powder to hopper (7), that is the amount of polyolefin powder delivered to hopper (7) per time unit. Solid flow meter (9) is equipped with a controller (10). Controller (10) sends a signal (11) to motor M of rotary valve (5) for adjusting the flow rate of the polyolefin powder if the flow rate measured by solid flow meter (9) differs from the targeted set point of the flow rate previously implemented in controller (10). Controller (10) also sends a signal (12), which is indicative of the flow rate of polyolefin powder from storage vessel (2) to hopper (7), to a computing unit (13).

FIG. 1 shows two similar units including dosing devices (15) for feeding additives in particulate form to hopper (7). In some embodiments, the process includes one or three or more additive feeding units. In each unit, an additive or an additive mixture is provided via a line (14) to a dosing device (15) being operated by a motor M. Dosing devices (15) are capable of weighing the amount of the additive or additive mixture dosed into lines (16) through which the additives are supplied to hopper (7). Each dosing device (15) is equipped with a controller (17). Controllers (17) receive signals that indicate the amounts of additive dosed by respective dosing devices (15) into respective lines (16). The set points for the amounts of additives to be dosed are continuously calculated by computing unit (13) based on signal (12), which indicates the flow rate of polyolefin powder from storage vessel (2) to hopper (7), and based on a recipe for the polyolefin composition which recipe was previously entered into a computing unit (13).

The polyolefin powder and the additives are supplied via lines (6) and (16) to hopper (7), wherein the polyolefin powder and the additives are brought into contact with each other. The combination of polyolefin powder and additives is then transferred into the extruder device (8) and therein melted and homogenized. The melt is conveyed within extruder device (8) to pelletizing unit (18) from which the pelletized polyolefin composition is withdrawn via line (19).

The set-up shown in FIG. 1 further includes a unit for supplying polymer pellets to hopper (7). This unit has a pellet storage vessel (20), to which polymer pellets are provided via line (21). The polyolefin pellets are supplied via line (22) to rotary valve (23) which is operated by a motor M. The polyolefin pellets are then further transferred via line (24) to hopper (7) of extruder device (8). The amount of polyolefin pellets supplied to hopper (7) is given by the speed of motor M of rotary valve (23), which speed is set by computing unit (13) based on signal (12), indicating the flow rate of polyolefin powder from storage vessel (2) to hopper (7), and based on the recipe for the polyolefin composition which was previously entered into a computing unit (13).

Figure 2:
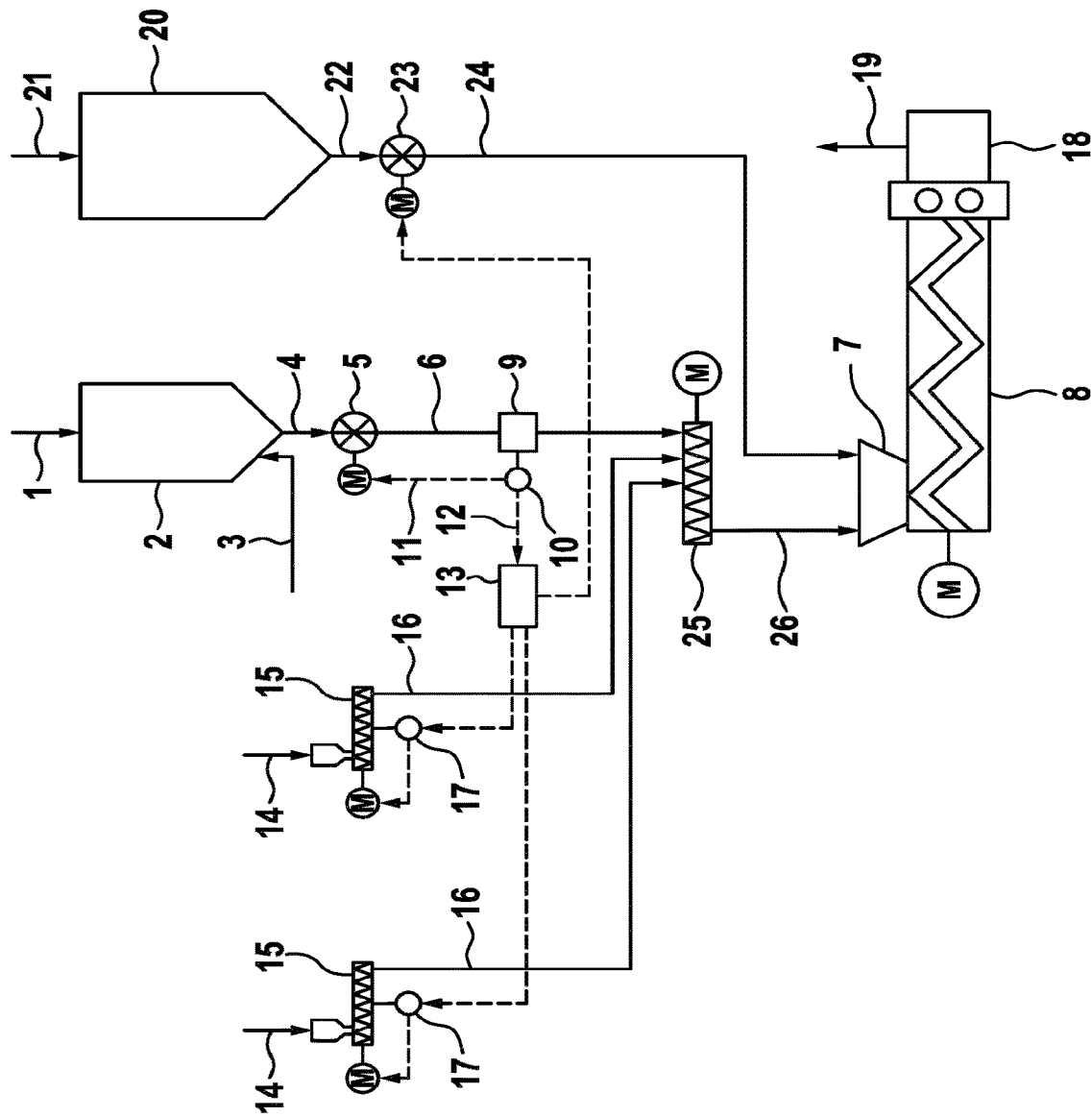
FIG. 2 shows schematically an embodiment of a set-up for preparing a polyolefin composition in which the polyolefin powder and the additives are first supplied to a mixing device before being transferred to the hopper of the extruder device.

FIG. 2 shows schematically an embodiment of a set-up for preparing a polyolefin composition in which the polyolefin powder and the additives are first mixed in a mixing device (25) before being supplied to the hopper (7) of extruder device (8).

The set-up for preparing a polyolefin composition shown in FIG. 2 is identical to that shown in FIG. 1, except that the polyolefin powder and the additives are supplied via lines (6) and (16) to mixing device (25). In some embodiments, the mixing device (25) is a paddle mixer including two horizontally orientated counter-rotating shafts. The mixture of polyolefin powder and additives is transferred by gravity from mixing device (25) to hopper (7) of extruder device (8) via line (26).

By feeding the polyolefin as powder, in other words, in the form of small particles, to the hopper of the extruder and contacting the polyolefin powder with the additives, a combination of polyolefin powder and additives can be transferred into the extruder device, thereby allowing a uniform distribution of additives throughout produced polymer pellets. By pre-mixing the polyolefin powder and the additives in a mixing device before supplying the components to the hopper of the extruder device, a more homogeneous distribution can be achieved even if the individual particles of the polyolefin powder employed for preparing the polyolefin compositions vary widely in their composition. Furthermore, it is believed that selecting the flow rate of the polyolefin powder supplied to the extruder device as a parameter for adjusting the flow rates of additives allows feeding of the components of the polyolefin composition accurately at a constant ratio and facilitates consistent properties of the polyolefin composition due to the homogeneity of the additive distribution within the produced polyolefin compositions.

What is claimed is:

1. A process for continuously preparing polyolefin pellets of a polyolefin composition in an extruder device, comprising:
   (i) supplying a bimodal or multimodal polyolefin at a flow rate as a polyolefin powder to a hopper of the extruder device;
   (ii) measuring a flow rate of the polyolefin pellets prepared in the extruder device;
   (iii) supplying one or more additives to the hopper;
   (iv) adjusting the flow rate of the polyolefin powder to the hopper in response to the measured flow rate of the polyolefin pellets and either
      (1) keeping the flow rates of the additives supplied to the hopper constant or
      (2) adjusting the flow rates of the additives supplied to the hopper in response to the measured flow rate of the polyolefin pellets;
   (v) transferring the polyolefin powder and the additives from the hopper into the extruder device;
   (vi) melting and homogenizing the polyolefin powder and the additives within the extruder device to form a molten polyolefin composition; and
   (vii) pelletizing the molten polyolefin composition, thereby yielding the polyolefin pellets.

2. The process of claim 1, wherein the flow rate of the polyolefin powder is measured.

3. The process of claim 2, wherein the flow rate of the polyolefin powder or the flow rate of the polyolefin pellets is measured by a solids flow meter.

4. The process of claim 1, wherein the polyolefin powder is supplied from a storage vessel, into which the polyolefin powder is kept in free flowing state by a discharging aid.

5. The process of claim 1, wherein the polyolefin powder and the additives are first supplied to a mixing device, which mixes the polyolefin powder and the additives, and the mixture of polyolefin powder and additives is then transferred from the mixing device to the hopper, and wherein the flow rates of the additives are measured while being supplied to the mixing device and the flow rates of the additives and the polyolefin powder supplied to the mixing device are adjusted in response to the measured flow rate of the polyolefin pellets.

6. The process of claim 5, wherein the mixing device is a paddle mixer comprising two horizontally orientated counter-rotating shafts.

7. The process of claim 1, wherein the polyolefin powder is transferred from the storage vessel to the hopper by gravity.

8. The process of claim 1, wherein the polyolefin powder is obtained by polymerizing one or more 1-olefins in a cascade of at least two polymerization reactors.

9. The process of claim 1, wherein the polyolefin is a polyethylene.

10. The process of claim 9, wherein the polyethylene is a high density polyethylene having a density determined according to ISO 1183 at 23° C. from about 0.945 to about 0.965 g/cm³.

11. The process of claim 1, wherein one of the additives is carbon black.

12. The process of claim 11, wherein the carbon black is fed in form of a carbon black masterbatch.

13. The process of claim 1, further comprising the steps of:
(viii) supplying polyolefin pellets to the hopper; and
(ix) adjusting the flow rate of the polymer pellets fed to the hopper in response to the measured flow rate of the polyolefin pellets.

14. The process of claim 1, wherein the extruder device is selected from the group consisting of (a) a continuous mixer with counter rotating and intermeshing double screws and (b) extruder devices having at least one co-rotating double screw extruder.

15. The process of claim 1, wherein the flow rate of the polyolefin pellets is measured by a solids flow meter.

16. A process for continuously preparing a polyolefin composition comprising bimodal or multimodal polyolefin and one or more additives in an extruder device equipped with at least one hopper, wherein polyolefin pellets are prepared from the polyolefin composition in the extruder device, the process comprising:
(i) supplying a bimodal or multimodal polyolefin in form of a polyolefin powder which has been obtained by polymerizing one or more 1-olefins in a cascade of at least two polymerization reactors to the hopper;
(ii) measuring a flow rate of the polyolefin pellets prepared in the extruder device;
(iii) supplying one or more additives to the same hopper;
(iv) adjusting the flow rate of the polyolefin powder to the hopper in response to the measured flow rate of the polyolefin pellets and either keeping the flow rates of the one or more additives supplied to the hopper constant or also adjusting the flow rates of the one or more additives supplied to the hopper in response to the measured flow rate of the polyolefin pellets;
(v) transferring the polyolefin powder and the additives from the hopper into the extruder device;
(vi) melting and homogenizing the polyolefin powder and additives within the extruder device to form a molten polyolefin composition; and
(vii) pelletizing the molten polyolefin composition.

17. The process of claim 16, wherein the polyolefin is a polyethylene.

18. The process of claim 17, wherein the polyethylene is a high density polyethylene having a density determined according to ISO 1183 at 23° C. from 0.945 to 965 g/cm³.

19. A process for continuously preparing a polyolefin composition comprising bimodal or multimodal polyolefin and one or more additives in an extruder device equipped with at least one hopper, wherein polyolefin pellets are prepared from the polyolefin composition in the extruder device, the process comprising:
(i) supplying a bimodal or multimodal polyolefin in form of a polyolefin powder to the hopper;
(ii) measuring a flow rate of the polyolefin pellets prepared in the extruder device;
(iii) supplying one or more additives to the same hopper;
(iv) adjusting the flow rate of the polyolefin powder to the hopper in response to the measured flow rate of the polyolefin pellets and either keeping the flow rates of the one or more additives supplied to the hopper constant or also adjusting the flow rates of the one or more additives supplied to the hopper in response to the measured flow rate of the polyolefin pellets;
(v) transferring the polyolefin powder and the additives from the hopper into the extruder device;
(vi) melting and homogenizing the polyolefin powder and additives within the extruder device to form a molten polyolefin composition;
(vii) pelletizing the molten polyolefin composition;
(viii) supplying polyolefin pellets to the same hopper; and
(ix) adjusting the flow rate of the polymer pellets fed to the hopper in response to the measured flow rate of the polyolefin pellets.

* * * * *

UNITED STATES PATENT AND TRADEMARK OFFICE
CERTIFICATE OF CORRECTION

PATENT NO. : 10,899,041 B2
APPLICATION NO. : 16/507987
DATED : January 26, 2021
INVENTOR(S) : Kruempel et al.

It is certified that error appears in the above-identified patent and that said Letters Patent is hereby corrected as shown below:

On the Title Page

Item [30], Line 1, delete "14196371" and insert -- 14196371.0 --, therefor

Signed and Sealed this
Fourteenth Day of March, 2023

Katherine Kelly Vidal
*Director of the United States Patent and Trademark Office*